G. W. BLAKE.
AIR-TRAP FOR STEAM RADIATORS.
No. 177,793. Patented May 23, 1876.
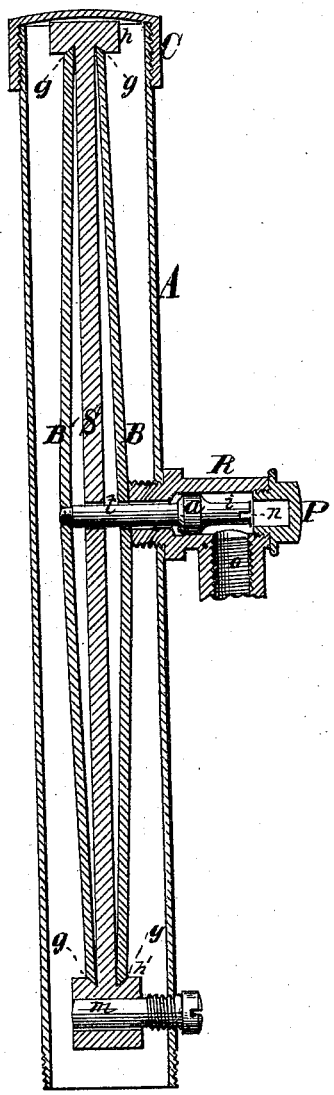
Witnesses:
Michael Ryan
Fred Haynes
G. W. Blake
by his Attorneys
Brown & Allen

UNITED STATES PATENT OFFICE.

GEORGE W. BLAKE, OF NEW YORK, N. Y.

IMPROVEMENT IN AIR-TRAPS FOR STEAM-RADIATORS.

Specification forming part of Letters Patent No. 177,793, dated May 23, 1876; application filed April 11, 1876.

*To all whom it may concern:*

Be it known that I, GEORGE W. BLAKE, of the city, county, and State of New York, have invented an Improvement in Air-Traps for Steam-Radiators; and I do hereby declare that the following is a full, clear, and exact description of the same, reference being had to the accompanying drawing, which forms part of this specification.

My invention is an improvement upon an invention for which Letters Patent No. 92,571, dated July 13, 1869, were granted to me, being an improvement in air-traps, which permits the admission of air to the interior of steam-radiators when the steam is shut off from said radiator, and the expulsion of air from the same upon the admission of steam thereto, without the escape of steam after the trap has been heated by said steam.

The objects of the improvement for which I now apply for Letters Patent are the simplification of the mechanism by the substitution of less complicated parts for others employed in my original air-trap, and provision for greater facility in reaching the valve and valve-seat, for cleaning and other purposes.

A in the drawing represents a hollow cylinder of ordinary steam-pipe, provided at one end with a screw-cap, C, and screw-threaded at the opposite end, for insertion into the steam-radiator at that part where the air-cock is usually inserted.

Within the cylinder A is a three-leaved buckling spring, B S B', the leaves B B' of which are of brass, and the middle leaf of which is of steel or iron. The said middle leaf is provided with heads $h$ $h'$, and in beveled grooves $g$ the ends of the brass leaves are caused to engage, said brass bars being of a length which causes them to buckle or bend outward.

The buckling-spring is partly supported and kept from turning by the support-screw $m$, which is screwed into the side of the said cylinder near the end which is inserted into the radiator.

A valve-box, R, is screwed into the side of the cylinder A near the middle thereof. The valve $a$ is fitted to a seat on the inner part of the valve-box R, which is closed at its outer end by a screw-plug, P.

In the side of the valve-box R is provided a passage, $o$, into which a pipe may be screwed to carry off drippings of condensed steam, and which admits the outward or inward passage of air when the air-trap is in operation.

The valve $a$ has an elongated head, $i$, with a nick, $n$, cut therein for the application of a screw-driver thereto. The said valve has a stem, $t$, which penetrates to the interior of the cylinder C, and, passing through holes in the middle of the brass leaf B and the middle leaf S of the buckling spring, screws into the brass leaf B'.

It is plain that the buckling of the brass bars which takes place under the action of heat through the unequal expansion of the leaves B S B' will draw the valve $a$ down upon its seat, and that when the buckling spring cools, the valve will be pushed away from its seat. Therefore, when the steam is shut off from the radiator and the buckling spring cools, the valve $a$ opens and admits air to the interior of the radiator. On the contrary, when steam enters the radiator, the air is forced out of the same until steam finally enters the cylinder A. The buckling spring is then heated, the valve closes, and the escape of steam is prevented.

This construction enables me to dispense with the separate spring used for opening the valve in my former invention, hereinbefore referred to, and also to reach the valve for cleaning, &c., by simply unscrewing the plug P, instead of taking out the entire valve-box.

I claim—

The combination of the three-leaved buckling spring B S B', the cylinder A, the valve-box R, and the inwardly-closing valve $a$, with its stem $t$ penetrating through the leaves B and S of the buckling spring nearer the valve-seat, and secured to that leaf, B', farthest from the seat, substantially as described.

GEO. W. BLAKE.

Witnesses:
MICHAEL RYAN,
FRED. HAYNES.